US012367997B2

(12) United States Patent
Sakai

(10) Patent No.: US 12,367,997 B2
(45) Date of Patent: Jul. 22, 2025

(54) COIL COMPONENT

(71) Applicant: Murata Manufacturing Co., Ltd., Kyoto-fu (JP)

(72) Inventor: Takashi Sakai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 760 days.

(21) Appl. No.: 17/710,620

(22) Filed: Mar. 31, 2022

(65) Prior Publication Data

US 2022/0328230 A1 Oct. 13, 2022

(30) Foreign Application Priority Data

Apr. 8, 2021 (JP) ................................ 2021-066042

(51) Int. Cl.

| | |
|---|---|
| ***H01F 5/00*** | (2006.01) |
| ***H01F 17/00*** | (2006.01) |
| ***H01F 17/06*** | (2006.01) |
| ***H01F 27/28*** | (2006.01) |
| ***H01F 27/29*** | (2006.01) |

(52) U.S. Cl.

CPC ......... *H01F 17/06* (2013.01); *H01F 17/0013* (2013.01); *H01F 27/2804* (2013.01); *H01F 27/29* (2013.01); *H01F 2017/065* (2013.01)

(58) Field of Classification Search

CPC .................................................. H01F 27/2804
USPC .......................................................... 336/200
See application file for complete search history.

(56) References Cited

U.S. PATENT DOCUMENTS

| | | | | |
|---|---|---|---|---|
| 6,304,164 | B1 | 10/2001 | Ohno et al. | |
| 2010/0194513 | A1* | 8/2010 | Ozawa | H05K 1/165 336/200 |
| 2014/0333405 | A1* | 11/2014 | Choto | H01F 17/0013 336/200 |
| 2015/0097137 | A1 | 4/2015 | Wada et al. | |

(Continued)

FOREIGN PATENT DOCUMENTS

| | | |
|---|---|---|
| CN | 106057393 A | 10/2016 |
| CN | 112331444 A | 2/2021 |
| JP | H11-297531 A | 10/1999 |

(Continued)

OTHER PUBLICATIONS

English translation of JP2018019033 (Year: 2018).*

*Primary Examiner* — Ronald Hinson
(74) *Attorney, Agent, or Firm* — Studebaker Brackett PLLC

(57) ABSTRACT

A coil component includes an insulator part, a coil that is embedded in the insulator part and includes a plurality of coil conductor layers electrically connected together, and outer electrodes that are disposed on surfaces of the insulator part and are electrically connected to the coil. The insulator part includes a magnetic phase containing at least Fe, Ni, Zn, and Cu and a non-magnetic phase containing at least Si and Zn. A portion of the insulator part located between, of the coil conductor layers, adjacent coil conductor layers has a pore area percentage of 0.3% or more and 3.0% or less (i.e., from 0.3% to 3.0%). The portion of the insulator part located between the adjacent coil conductor layers includes crystal grains having an average crystal grain size of 0.2 μm or more and 0.8 μm or less (i.e., from 0.2 μm to 0.8 μm).

9 Claims, 3 Drawing Sheets

(56) References Cited

U.S. PATENT DOCUMENTS

| | | | | |
|---|---|---|---|---|
| 2016/0293301 | A1 | 10/2016 | Choto et al. | |
| 2016/0314891 | A1* | 10/2016 | Onozaki | H01F 41/041 |

FOREIGN PATENT DOCUMENTS

| | | | |
|---|---|---|---|
| JP | 2010-103266 | A | 5/2010 |
| JP | 2016-196397 | A | 11/2016 |
| JP | 2016-196398 | A | 11/2016 |
| JP | 2019-210204 | A | 12/2019 |
| JP | 2020-194811 | A | 12/2020 |
| JP | 2021-027159 | A | 2/2021 |

* cited by examiner

COIL COMPONENT

CROSS-REFERENCE TO RELATED APPLICATION

This application claims benefit of priority to Japanese Patent Application No. 2021-066042 filed Apr. 8, 2021, the entire content of which is incorporated herein by reference.

BACKGROUND

Technical Field

The present disclosure relates to a coil component.

Background Art

It has been reported that, in a coil component, the use of a composite magnetic material that contains a ferrite composition and zinc silicate can provide an electronic component including an element body with a high specific resistance, as described, for example, in Japanese Unexamined Patent Application Publication No. 2019-210204.

SUMMARY

Japanese Unexamined Patent Application Publication No. 2019-210204 discloses an electronic component including an element body with a high specific resistance; however, even in the case of using the composite magnetic material described in Japanese Unexamined Patent Application Publication No. 2019-210204, insulting properties between coil conductors of the coil component may be insufficient in some cases.

Accordingly, the present disclosure provides a coil component having high withstand voltage characteristics.

The present disclosure includes the following embodiments.

[1] A coil component includes an insulator part; a coil that is embedded in the insulator part and includes a plurality of coil conductor layers electrically connected together; and outer electrodes that are disposed on surfaces of the insulator part and are electrically connected to the coil. The insulator part includes a magnetic phase containing at least Fe, Ni, Zn, and Cu and a non-magnetic phase containing at least Si and Zn. A portion of the insulator part located between, of the coil conductor layers, adjacent coil conductor layers has a pore area percentage of 0.3% or more and 3.0% or less (i.e., from 0.3% to 3.0%), and the portion of the insulator part located between the adjacent coil conductor layers includes crystal grains having an average crystal grain size of 0.2 μm or more and 0.8 μm or less (i.e., from 0.2 μm to 0.8 μm).

[2] In the coil component according to [1] described above, a substantially central portion of the insulator part may have a pore area percentage higher than the pore area percentage of the portion of the insulator part located between the adjacent coil conductor layers.

[3] In the coil component according to [2] described above, the substantially central portion of the insulator part may have a pore area percentage of 2.0% or more and 6.0% or less (i.e., from 2.0% to 6.0%).

[4] In the coil component according to any one of [1] to [3] described above, the insulator part may contain 28 mol % or more and 41 mol % or less (i.e., from 28 mol % to 41 mol %) of Fe in terms of $Fe_2O_3$, 16 mol % or more and 24 mol % or less (i.e., from 16 mol % to 24 mol %) of Ni in terms of NiO, 23 mol % or more and 37 mol % or less (i.e., from 23 mol % to 37 mol %) of Zn in terms of ZnO, 5 mol % or more and 9 mol % or less (i.e., from 5 mol % to 9 mol %) of Cu in terms of CuO, and 4 mol % or more and 14 mol % or less (i.e., from 4 mol % to 14 mol %) of Si in terms of $SiO_2$.

[5] In the coil component according to any one of [1] to [4] described above, a stacking direction of the coil conductor layers may be parallel to a coil-mounting surface.

The present disclosure can provide a coil component having high withstand voltage characteristics.

DETAILED DESCRIPTION

Figure 1:
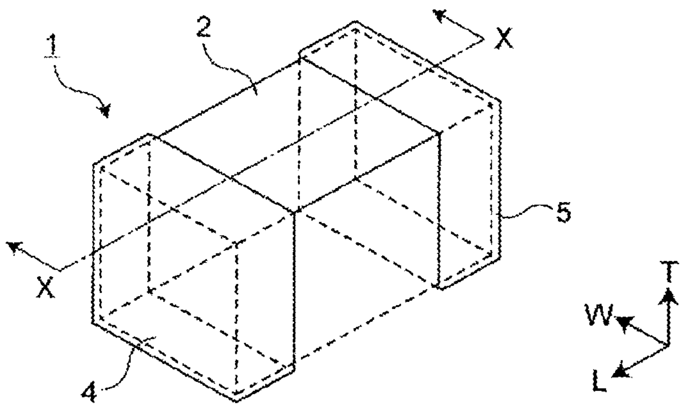
FIG. 1 is a perspective view that schematically illustrates a coil component according to the present disclosure.

The present disclosure will be described in detail below with reference to the drawings. The shape, arrangement, and other features of the coil component of this embodiment and respective constituent elements thereof are not limited to the examples illustrated in the drawings.

Figure 2:
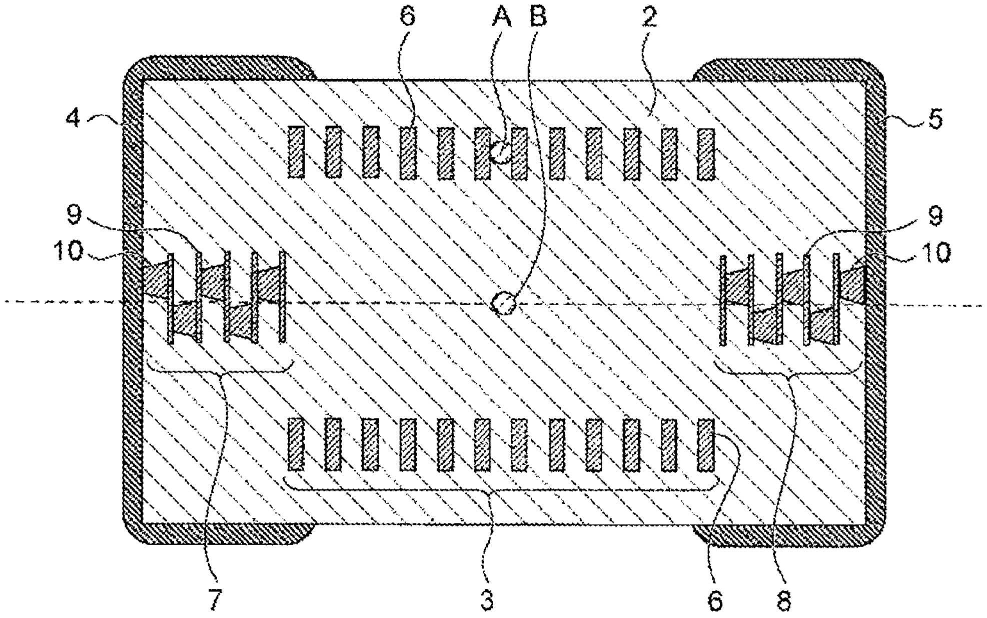
FIG. 2 is a sectional view illustrating a section taken along line x-x of the coil component illustrated in FIG. 1.

FIG. 1 is a perspective view of a coil component 1 of this embodiment, and FIG. 2 is a sectional view taken along line x-x in FIG. 1. The shape, arrangement, and other features of the coil component of the embodiment described below and respective constituent elements thereof are not limited to the examples illustrated in the drawings.

As illustrated in FIGS. 1 and 2, the coil component 1 of this embodiment is a coil component having a substantially rectangular parallelepiped shape. In the coil component 1, surfaces perpendicular to an L axis in FIG. 1 are referred to as "end surfaces", surfaces perpendicular to a W axis are referred to as "side surfaces", and surfaces perpendicular to a T axis are referred to as "an upper surface" and "a lower surface". The coil component 1 schematically includes an insulator part 2 and outer electrodes 4 and 5 disposed on two end surfaces of the insulator part 2. The insulator part 2 includes a coil 3 embedded therein. The coil 3 is constituted by coil conductor layers 6 that are stacked parallel to a mounting surface (the lower surface in this embodiment) of the coil component and that are connected together in the form of a coil through connection conductors that penetrate the insulator part 2. Of the coil conductor layers 6, coil conductor layers located at both ends are connected to outer electrodes 4 and 5 through extended portions 7 and 8, respectively.

In the coil component 1 of this embodiment, the insulator part 2 is constituted by stacking a plurality of insulator layers.

The insulator layers are preferably stacked parallel to the mounting surface of the coil component 1. That is, the insulator layers are stacked in the horizontal direction in FIG. 2.

The thickness of an insulator layer between the coil conductor layers 6 may preferably be 3 μm or more and 50

μm or less (i.e., from 3 μm to 50 μm), more preferably 3 μm or more and 40 μm or less (i.e., from 3 μm to 40 μm), and still more preferably 3 μm or more and 20 μm or less (i.e., from 3 μm to 20 μm). When the thickness is 3 μm or more, insulating properties between the coil conductor layers can be more reliably ensured. When the thickness is 50 μm or less, better electrical characteristics can be obtained.

The insulator part 2 includes a magnetic phase and a non-magnetic phase. When the insulator part includes the magnetic phase and the non-magnetic phase, good electrical characteristics can be obtained.

The magnetic phase contains at least Fe, Zn, Cu, and Ni.

The magnetic phase is preferably formed of a sintered magnetic material that contains at least Fe, Zn, Cu, and Ni as main components.

In the sintered magnetic material, the Fe content may preferably be, in terms of $Fe_2O_3$, 40.0 mol % or more and 49.5 mol % or less (i.e., from 40.0 mol % to 49.5 mol %) (with reference to the total of the main components; the same applies hereinafter) and more preferably 45.0 mol % or more and 49.5 mol % or less (i.e., from 45.0 mol % to 49.5 mol %).

In the sintered magnetic material, the Zn content may preferably be, in terms of ZnO, 2.0 mol % or more and 35.0 mol % or less (i.e., from 2.0 mol % to 35.0 mol %) (with reference to the total of the main components; the same applies hereinafter) and more preferably 5.0 mol % or more and 30.0 mol % or less (i.e., from 5.0 mol % to 30.0 mol %).

In the sintered magnetic material, the Cu content is, in terms of CuO, preferably 6.0 mol % or more and 13.0 mol % or less (i.e., from 6.0 mol % to 13.0 mol %) (with reference to the total of the main components; the same applies hereinafter) and more preferably 7.0 mol % or more and 10.0 mol % or less (i.e., from 7.0 mol % to 10.0 mol %).

In the sintered magnetic material, the Ni content is not particularly limited, can be the balance excluding the other main components described above, namely, Fe, Zn, and Cu, and is, in terms of NiO, preferably 10.0 mol % or more and 45.0 mol % or less (i.e., from 10.0 mol % to 45.0 mol %) (with reference to the total of the main components; the same applies hereinafter) and more preferably 15.0 mol % or more and 40.0 mol % or less (i.e., from 15.0 mol % to 40.0 mol %).

When the contents of Fe, Zn, Cu, and Ni are within the above ranges, good electrical characteristics can be obtained.

In the present disclosure, the sintered magnetic material may further contain additive components. Examples of the additive components in the sintered magnetic material include, but are not limited to, Mn, Co, Sn, Bi, and Si. The contents of Mn, Co, Sn, Bi, and Si (amounts added) are each preferably 0.1 parts by mass or more and 1 part by mass or less (i.e., from 0.1 parts by mass to 1 part by mass) in terms of $Mn_3O_4$, $Co_3O_4$, $SnO_2$, $Bi_2O_3$, and $SiO_2$, respectively, relative to 100 parts by mass of the total of the main components (Fe (in terms of $Fe_2O_3$), Zn (in terms of ZnO), Cu (in terms of CuO), and Ni (in terms of NiO)). The sintered magnetic material may further contain impurities that are unavoidable during the production.

The non-magnetic phase contains at least Si and Zn.

The non-magnetic phase is preferably formed of a sintered non-magnetic material that contains at least Si and Zn as main components.

In the sintered non-magnetic material, a molar ratio (Zn/Si) of the Zn content to the Si content is preferably 1.8 or more and 2.2 or less (i.e., from 1.8 to 2.2) and more preferably 1.9 or more and 2.1 or less (i.e., from 1.9 to 2.1), where the Zn content is expressed in terms of ZnO and the Si content is expressed in terms of $SiO_2$. When the ratio of the Zn content to the Si content is within the above range, good electrical characteristics can be obtained.

The sintered non-magnetic material may further contain impurities that are unavoidable during the production.

In the insulator part, the Fe content may preferably be, in terms of $Fe_2O_3$, 28.0 mol % or more and 41.0 mol % or less (i.e., from 28.0 mol % to 41.0 mol %) (with reference to the total of the main components; the same applies hereinafter) and more preferably 30.0 mol % or more and 38.0 mol % or less (i.e., from 30.0 mol % to 38.0 mol %).

In the insulator part, the Ni content is, in terms of NiO, preferably 16.0 mol % or more and 24.0 mol % or less (i.e., from 16.0 mol % to 24.0 mol %) (with reference to the total of the main components; the same applies hereinafter) and more preferably 17.0 mol % or more and 20.0 mol % or less (i.e., from 17.0 mol % to 20.0 mol %).

In the insulator part, the Zn content may preferably be, in terms of ZnO, 23.0 mol % or more and 37.0 mol % or less (i.e., from 23.0 mol % to 37.0 mol %) (with reference to the total of the main components; the same applies hereinafter) and more preferably 25.0 mol % or more and 35.0 mol % or less (i.e., from 25.0 mol % to 35.0 mol %).

In the insulator part, the Cu content is, in terms of CuO, preferably 5.0 mol % or more and 9.0 mol % or less (i.e., from 5.0 mol % to 9.0 mol %) (with reference to the total of the main components; the same applies hereinafter) and more preferably 6.0 mol % or more and 8.0 mol % or less (i.e., from 6.0 mol % to 8.0 mol %).

In the insulator part, the Si content is, in terms of $SiO_2$, preferably 4.0 mol % or more and 14.0 mol % or less (i.e., from 4.0 mol % to 14.0 mol %) (with reference to the total of the main components; the same applies hereinafter) and more preferably 6.0 mol % or more and 12.0 mol % or less (i.e., from 6.0 mol % to 12.0 mol %).

In the insulator part, an average crystal grain size of crystal grains in a portion (A in FIG. 2) of the insulator part located between adjacent coil conductor layers is 0.2 μm or more and 0.8 μm or less (i.e., from 0.2 μm to 0.8 μm) and preferably 0.2 μm or more and 0.5 μm or less (i.e., from 0.2 μm to 0.5 μm). When the average crystal grain size is within the above range, withstand voltage characteristics of the coil component are improved.

In the insulator part, an average crystal grain size of crystal grains in a substantially central portion (B in FIG. 2) of the insulator part is preferably 0.2 μm or more and 0.8 μm or less (i.e., from 0.2 μm to 0.8 μm) and more preferably 0.2 μm or more and 0.5 μm or less (i.e., from 0.2 μm to 0.5 μm). When the average crystal grain size is within the above range, withstand voltage characteristics of the coil component are improved.

In the insulator part, the average crystal grain size of crystal grains in the substantially central portion of the insulator part is higher than the average crystal grain size of crystal grains in the portion of the insulator part located between the adjacent coil conductor layers. When the average crystal grain size of crystal grains in the substantially central portion of the insulator part is higher than the average crystal grain size of crystal grains of the portion of the insulator part located between the adjacent coil conductor layers, withstand voltage characteristics of the coil component are improved.

In the insulator part, the average crystal grain size of crystal grains in the substantially central portion of the insulator part is preferably 1.01 times or more and 2.0 times or less (i.e., from 1.01 times to 2.0 times), more preferably 1.01 times or more and 1.5 times or less (i.e., from 1.01 times to 1.5 times), still more preferably 1.01 times or more and 1.2 times or less (i.e., from 1.01 times to 1.2 times), and even still more preferably 1.02 times or more and 1.2 times or less (i.e., from 1.02 times to 1.2 times) the average crystal grain size of crystal grains in the portion of the insulator part located between the adjacent coil conductor layers.

The average crystal grain size can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. For the section processed by FIB, crystal grain sizes are measured in an observation area (8 μm×8 μm) to determine the average crystal grain size. Herein, the average crystal grain size refers to a grain size at which the area equivalent circle diameter of a crystal grain reaches 50% on a number basis.

In the insulator part, a pore area percentage in a portion of the insulator part located between adjacent coil conductor layers is preferably 0.3% or more and 3.0% or less (i.e., from 0.3% to 3.0%), more preferably 0.5% or more and 2.5% or less (i.e., from 0.5% to 2.5%), and still more preferably 1.0% or more and 2.5% or less (i.e., from 1.0% to 2.5%). When the pore area percentage is within the above range, withstand voltage characteristics of the coil component are improved.

In the insulator part, a pore area percentage in a substantially central portion of the insulator part is preferably 2.0% or more and 6.0% or less (i.e., from 2.0% to 6.0%), more preferably 2.5% or more and 5.0% or less (i.e., from 2.5% to 5.0%), and still more preferably 3.0% or more and 4.5% or less (i.e., from 3.0% to 4.5%). When the pore area percentage is within the above range, withstand voltage characteristics of the coil component are improved.

In the insulator part, the pore area percentage in the substantially central portion of the insulator part is higher than the pore area percentage in the portion of the insulator part located between adjacent coil conductor layers. When the pore area percentage in the substantially central portion of the insulator part is higher than the pore area percentage in the portion of the insulator part located between adjacent coil conductor layers, withstand voltage characteristics of the coil component are improved.

In the insulator part, the pore area percentage in the substantially central portion of the insulator part is preferably 1.1 times or more and 7.0 times or less (i.e., from 1.1 times to 7.0 times), more preferably 1.1 times or more and 5.0 times or less (i.e., from 1.1 times to 5.0 times), still more preferably 1.5 times or more and 4.0 times or less (i.e., from 1.5 times to 4.0 times), and even still more preferably 2.0 times or more and 3.0 times or less (i.e., from 2.0 times to 3.0 times) the pore area percentage in the portion of the insulator part located between adjacent coil conductor layers.

The pore area percentage can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. For the section processed by FIB, an observation area (8 μm×8 μm) is photographed with a scanning electron microscope (SEM). For the obtained SEM image, the percentage of the area occupied by pores with respect to the total area is determined by using image analysis software and is defined as the pore area percentage.

The coil 3 is constituted by the coil conductor layers 6 that are electrically connected together in the form of a coil. Of the coil conductor layers 6, coil conductor layers 6 that are adjacent to each other in the stacking direction are connected to each other through a connection conductor that penetrates the insulator part 2.

The material constituting the coil conductor layers is not particularly limited, and examples thereof include Au, Ag, Cu, Pd, and Ni. The material constituting the coil conductor layers is preferably Ag or Cu, and more preferably Ag. Only one conductive material or two or more conductive materials may be used.

The thickness of each of the coil conductor layers may preferably be 5 μm or more and 25 μm or less (i.e., from 5 μm to 25 μm), and more preferably 5 μm or more and 15 μm or less (i.e., from 5 μm to 15 μm). An increase in the thickness of the coil conductor layer further reduces the resistance value of the coil component. Herein, the thickness of the coil conductor layer refers to a thickness of the coil conductor layer in the stacking direction.

The thickness of the coil conductor layer can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. The section processed by FIB is observed with a scanning electron microscope (SEM), and the thickness at an L-dimension central portion of the coil conductor layer is measured by a measuring function accompanying the SEM.

The connection conductors are each disposed so as to penetrate the insulator part between coil conductor layers. The material constituting the connection conductors can be a material described in relation to the above-described coil conductor layers. The material constituting the connection conductors may be the same as or different from the material constituting the coil conductor layers. In a preferred embodiment, the material constituting the connection conductors is the same as the material constituting the coil conductor layers. In a preferred embodiment, the material constituting the connection conductors is Ag.

The extended portions 7 and 8 are each constituted by a plurality of land conductor layers 9 that are electrically connected together through via conductors 10.

The material constituting the land conductor layers is not particularly limited, and examples thereof include Au, Ag, Cu, Pd, and Ni. The material constituting the land conductor layers is preferably Ag or Cu, and more preferably Ag. Only one material or two or more materials may be used as the material constituting the land conductor layers. Although the material constituting the land conductor layers may be the same as or different from the material constituting the coil conductor layers, the materials are preferably the same.

The thickness of each of the land conductor layers may preferably be 5 μm or more and 25 μm or less (i.e., from 5 μm to 25 μm), and more preferably 5 μm or more and 15 μm or less (i.e., from 5 μm to 15 μm). An increase in the thickness of the land conductor layer further reduces the resistance value of the coil component. Herein, the thickness of the land conductor layer refers to a thickness of the land conductor layer in the stacking direction.

The thickness of the land conductor layer can be measured as in the thickness of the coil conductor layer.

The via conductors are each disposed so as to penetrate the insulator part between land conductor layers. The material constituting the via conductors can be a material described in relation to the above-described land conductor layers. The material constituting the via conductors may be the same as or different from the material constituting the land conductor layers. In a preferred embodiment, the material constituting the via conductors is the same as the material constituting the land conductor layers. In a preferred embodiment, the material constituting the via conductors is Ag.

Figure 3A:
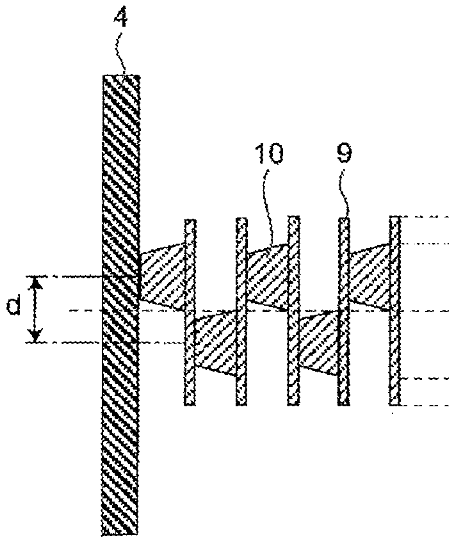
FIGS. 3A and 3B are sectional views illustrating an extended portion in which via conductors 10 are alternately disposed.
Figure 3B:
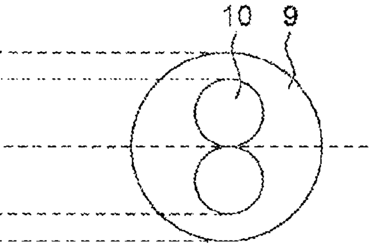

In this embodiment, with regard to via conductors in each of the extended portions, adjacent via conductors in the stacking direction have centers that do not coincide when viewed in plan in the stacking direction (FIGS. 3A and 3B). That is, the centers of the adjacent via conductors in the stacking direction are displaced from each other. Displacing the centers of the adjacent via conductors in the stacking direction from each other can suppress the occurrence of cracking in the coil component.

In this embodiment, the adjacent via conductors in the stacking direction are displaced in a staggered manner. That is, when viewed in plan in the stacking direction, the via conductors are present at two positions, and adjacent via conductors are disposed so as to be located at positions different from one another.

In another embodiment, when viewed in plan in the stacking direction, adjacent via conductors in the stacking direction may be present at three or more positions. For example, when viewed in plan in the stacking direction, in the case where adjacent via conductors in the stacking direction are present at three positions, the via conductors may be disposed such that the centers of the via conductors located at the three positions draw a triangle, preferably a regular triangle.

A displacement width (d in FIG. 3A) between the centers of adjacent via conductors in the stacking direction is preferably 5 μm or more and 50 μm or less (i.e., from 5 μm to 50 μm), and more preferably 10 μm or more and 20 μm or less (i.e., from 10 μm to 20 μm).

The displacement width between the centers of adjacent via conductors in the stacking direction is preferably 0.05 times or more and 0.5 times or less (i.e., from 0.05 times to 0.5 times), more preferably 0.1 times of more and 0.4 times or less (i.e., from 0.1 times to 0.4 times), and still more preferably 0.1 times of more and 0.3 times or less (i.e., from 0.1 times to 0.3 times) the diameter of each of the via conductors. Herein, the diameter of the via conductor refers to the diameter of the largest portion among sections (sections parallel to the stacking surface) of the via conductor.

In a preferred embodiment, adjacent via conductors in the stacking direction do not overlap when viewed in plan in the stacking direction. That is, adjacent via conductors in the stacking direction are completely independent from each other when viewed in plan in the stacking direction. That is, the displacement width (d in FIG. 3A) between the centers of adjacent via conductors in the stacking direction is larger than the sum of the radii of the adjacent via conductors.

Figure 4A:
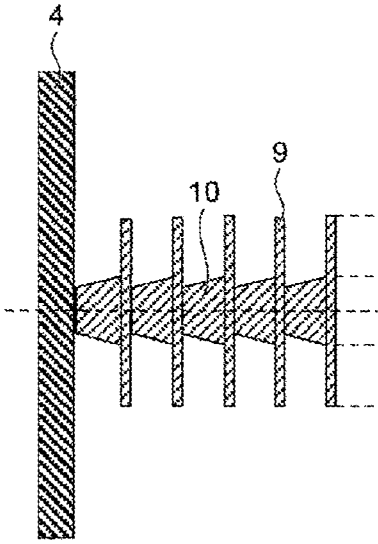
FIGS. 4A and 4B are sectional views illustrating an extended portion in which via conductors are disposed such that the c-enters thereof coincide with each other.
Figure 4B:
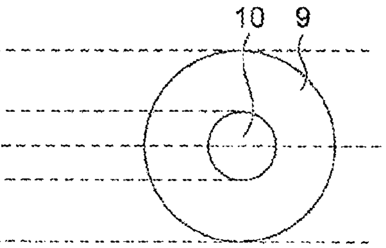

In another embodiment, adjacent via conductors in the stacking direction have centers that coincide with each other when viewed in plan in the stacking direction (FIGS. 4A and 4B).

The outer electrodes 4 and 5 are disposed so as to cover the two end surfaces of the insulator part 2. The outer electrodes are formed of a conductive material, preferably, at least one metal material selected from Au, Ag, Pd, Ni, Sn, and Cu.

The outer electrodes may be formed of a single layer or a plurality of layers. In one embodiment, the outer electrodes can be formed of a plurality of layers and preferably formed of two or more and four or less layers, for example, three layers.

In one embodiment, the outer electrodes are formed of a plurality of layers and can include a layer containing Ag or Pd, a layer containing Ni, or a layer containing Sn. In a preferred embodiment, the outer electrodes are formed of a layer containing Ag or Pd, a layer containing Ni, and a layer containing Sn. Preferably, the above-described layers are disposed, from the coil conductor layer side, in the order of the layer containing Ag or Pd, preferably Ag, the layer containing Ni, and the layer containing Sn. Preferably, the layer containing Ag or Pd is a layer formed by baking a Ag paste or a Pd paste, and the layer containing Ni and the layer containing Sn can be plating layers.

The coil component according to the present disclosure preferably has a length (L) of 0.4 mm or more and 3.2 mm or less (i.e., from 0.4 mm to 3.2 mm), a width (W) of 0.2 mm or more and 1.6 mm or less (i.e., from 0.2 mm to 1.6 mm), and a height (T) of 0.2 mm or more and 1.6 mm or less (i.e., from 0.2 mm to 1.6 mm) and more preferably has a length of 0.6 mm or more and 1.0 mm or less (i.e., from 0.6 mm to 1.0 mm), a width of 0.3 mm or more and 0.5 mm or less (i.e., from 0.3 mm to 0.5 mm), and a height of 0.3 mm or more and 0.5 mm or less (i.e., from 0.3 mm to 0.5 mm).

A method for producing the above coil component 1 of this embodiment will be described below.

(1) Preparation of Magnetic Material (Calcined Magnetic Powder)

First, a raw material of a magnetic material is prepared. The raw material of the magnetic material contains Fe, Zn, Cu, and Ni as main components. Typically, the main components of the raw material are substantially composed of oxides of Fe, Zn, Cu, and Ni (ideally, $Fe_2O_3$, ZnO, CuO, and NiO).

As the raw material, $Fe_2O_3$, ZnO, CuO, NiO, and, as needed, additive components are weighed so as to give a predetermined composition and are mixed and pulverized. The resulting powder is dried and calcined to obtain a calcined magnetic powder. Preferably, the resulting calcined magnetic powder is pulverized to obtain a fine powder.

The calcined magnetic powder preferably has a particle size of 0.1 μm or more and 0.2 μm or less (i.e., from 0.1 μm to 0.2 μm) in terms of D50. Herein, D50 refers to a size corresponding to 50% of the volume accumulation determined by a laser diffraction scattering particle size distribution measurement method.

In the calcined magnetic powder, the Fe content may preferably be, in terms of $Fe_2O_3$, 40.0 mol % or more and 49.5 mol % or less (i.e., from 40.0 mol % to 49.5 mol %) (with reference to the total of the main components; the same applies hereinafter) and more preferably 45.0 mol % or more and 49.5 mol % or less (i.e., from 45.0 mol % to 49.5 mol %).

In the calcined magnetic powder, the Zn content may preferably be, in terms of ZnO, 2.0 mol % or more and 35.0 mol % or less (i.e., from 2.0 mol % to 35.0 mol %) (with reference to the total of the main components; the same applies hereinafter) and more preferably 5.0 mol % or more and 30.0 mol % or less (i.e., from 5.0 mol % to 30.0 mol %).

In the calcined magnetic powder, the Cu content is, in terms of CuO, preferably 6.0 mol % or more and 13.0 mol % or less (i.e., from 6.0 mol % to 13.0 mol %) (with reference to the total of the main components; the same applies hereinafter) and more preferably 7.0 mol % or more and 10.0 mol % or less (i.e., from 7.0 mol % to 10.0 mol %).

In the calcined magnetic powder, the Ni content is not particularly limited, can be the balance excluding the other main components described above, namely, Fe, Zn, and Cu, and is, in terms of NiO, preferably 10.0 mol % or more and 45.0 mol % or less (i.e., from 10.0 mol % to 45.0 mol %) (with reference to the total of the main components; the same applies hereinafter) and more preferably 15.0 mol % or more and 40.0 mol % or less (i.e., from 15.0 mol % to 40.0 mol %).

In the present disclosure, the calcined magnetic powder may further contain additive components. Examples of the additive components in the calcined magnetic powder include, but are not limited to, Mn, Co, Sn, Bi, and Si. The contents of Mn, Co, Sn, Bi, and Si (amounts added) are each preferably 0.1 parts by mass or more and 1 part by mass or less (i.e., from 0.1 parts by mass to 1 part by mass) in terms of $Mn_3O_4$, $Co_3O_4$, $SnO_2$, $Bi_2O_3$, and $SiO_2$, respectively, relative to 100 parts by mass of the total of the main components (Fe (in terms of $Fe_2O_3$), Zn (in terms of ZnO), Cu (in terms of CuO), and Ni (in terms of NiO)). The calcined magnetic powder may further contain impurities that are unavoidable during the production.

The Fe content (in terms of $Fe_2O_3$), the Zn content (in terms of ZnO), the Cu content (in terms of CuO), and the Ni content (in terms of NiO) in the calcined magnetic powder may be considered to be substantially equal to the Fe content (in terms of $Fe_2O_3$), the Zn content (in terms of ZnO), the Cu content (in terms of CuO), and the Ni content (in terms of NiO), respectively, in the sintered magnetic material after firing.

(2) Preparation of Non-Magnetic Material (Calcined Non-Magnetic Powder)

First, a raw material of a non-magnetic material is prepared. The raw material of the non-magnetic material contains Si and Zn as main components. Typically, the main components of the raw material are substantially composed of oxides of Si and Zn (ideally, $SiO_2$ and ZnO).

As the raw material, $SiO_2$, ZnO, and, as needed, additive components are weighed so as to give a predetermined composition and are mixed and pulverized. The resulting powder is dried and calcined to obtain a calcined non-magnetic powder. Preferably, the resulting calcined non-magnetic powder is pulverized to obtain a fine powder.

The calcined non-magnetic powder preferably has a particle size of 0.1 μm or more and 0.2 μm or less (i.e., from 0.1 μm to 0.2 μm) in terms of D50. Herein, D50 refers to a size corresponding to 50% of the volume accumulation determined by a laser diffraction scattering particle size distribution measurement method.

In the calcined non-magnetic powder, the Si content is, in terms of $SiO_2$, preferably 31 mol % or more and 36 mol % or less (i.e., from 31 mol % to 36 mol %) (with reference to the total of the main components; the same applies hereinafter) and more preferably 32 mol % or more and 35 mol % or less (i.e., from 32 mol % to 35 mol %).

In the calcined non-magnetic powder, the Zn content is, in terms of ZnO, preferably 64 mol % or more and 69 mol % or less (i.e., from 64 mol % to 69 mol %) (with reference to the total of the main components; the same applies hereinafter) and more preferably 65 mol % or more and 68 mol % or less (i.e., from 65 mol % to 68 mol %).

The Si content (in terms of $SiO_2$) and the Zn content (in terms of ZnO) in the calcined non-magnetic powder may be considered to be substantially equal to the Si content (in terms of $SiO_2$) and the Zn content (in terms of ZnO), respectively, in the sintered non-magnetic material after firing.

(3) Preparation of Conductive Paste

First, a conductive material is prepared. Examples of the conductive material include Au, Ag, Cu, Pd, and Ni. Of these, Ag or Cu is preferred, and Ag is more preferred. A predetermined amount of a powder of the conductive material is weighed and kneaded with predetermined amounts of a solvent (such as eugenol), a resin (such as ethyl cellulose), and a dispersant in a planetary mixer or the like, and the resulting mixture is then dispersed in a three-roll mill or the like. Thus, a conductive paste can be prepared.

(4) Fabrication of Sheets

The magnetic material and the non-magnetic material prepared as described above are mixed so as to give a predetermined composition. The mixture of these is placed in, for example, a ball mill along with PSZ media, and an organic binder such as polyvinyl butyral, organic solvents such as ethanol and toluene, and a plasticizer are further added thereto and mixed to obtain a slurry. Next, the slurry is formed into a sheet by the doctor blade method or the like, and the sheet is punched into a rectangular shape to fabricate green sheets.

The thickness of each of the green sheets may be, for example, 5 μm or more and 40 μm or less (i.e., from 5 μm to 40 μm), and preferably 10 μm or more and 25 μm or less (i.e., from 10 μm to 25 μm). When the thickness of the green sheet is within the above range, high insulating properties and good electrical characteristics can be obtained.

A blending ratio (magnetic material:non-magnetic material (mass ratio)) of the magnetic material to the non-magnetic material in the mixture may preferably be 90:10 to 5:95, and more preferably 90:10 to 50:50. When the blending ratio of the magnetic material to the non-magnetic material is within the above range, good electrical characteristics can be obtained.

Next, the green sheets fabricated as described above are subjected to laser irradiation to form via holes at predetermined positions. The via holes are filled with the conductive paste prepared as described above by applying the conductive paste by screen printing to form connection conductor patterns and connection via patterns. Furthermore, the conductive paste is applied to the green sheets by screen printing to form coil patterns and land patterns.

(5) Stacking, Pressure-Bonding, and Division into Individual Pieces

The green sheets obtained as described above are stacked so as to obtain predetermined coil patterns, and the resulting stack is thermally pressure-bonded to fabricate a multilayer block. The resulting multilayer block is cut with a dicer or the like to be divided into individual pieces, thus obtaining an unfired element body.

(6) Firing

The unfired element body obtained as described above is fired to obtain an element body of a coil component.

The firing temperature may preferably be 850° C. or higher and 950° C. or lower (i.e., from 850° C. to 950° C.), and more preferably 900° C. or higher and 920° C. or lower.

The firing time may preferably be one hour or more and six hours or less (i.e., from one hour to six hours), and more preferably two hours or more and four hours or less (i.e., from two hours to four hours).

In a preferred embodiment, the firing is performed in a low-oxygen atmosphere at the top temperature thereof. The low-oxygen atmosphere refers to an atmosphere having an oxygen concentration of 0.01 vol % or more and 1 vol % or less (i.e., from 0.01 vol % to 1 vol %). The low-oxygen atmosphere at the top temperature of the firing can reduce the crystal grain size after firing. Preferably, the firing is performed in an air atmosphere in the temperature-decreasing process from the top temperature. The air atmosphere in the temperature-decreasing process can reduce the formation of a different phase.

After firing, the resulting element body may be placed in a rotary barrel machine along with media and rotated to round edges and corners of the element body.

(7) Formation of Electrodes

First, base electrodes are formed. The base electrodes can be formed by, for example, applying a conductive paste containing Ag and glass to end surfaces to which the coil is extended, and baking the conductive paste.

The thickness of each of the base electrodes may be, for example, 0.1 μm or more and 20 μm or less (i.e., from 0.1 μm to 20 μm), preferably 3 μm or more and 17 μm or less (i.e., from 3 μm to 17 μm), and more preferably 5 μm or more and 15 μm or less (i.e., from 5 μm to 15 μm).

The temperature during the baking may be, for example, 800° C. or higher and 820° C. or lower (i.e., from 800° C. to 820° C.).

For the element body having the base electrodes thereon, a coating film formed of a metal layer is formed on the base electrodes by electrolytic plating. The coating film may be formed of a single layer or a plurality of layers. For example, a Ni coating film may be formed on the base electrodes, and a Sn coating film may then be formed.

Although one embodiment of the present disclosure has been described above, various modifications can be made to this embodiment.

A coil component according to the present disclosure will now be described with reference to Examples. The present disclosure is not limited to these Examples.

EXAMPLES

Examples

Preparation of Magnetic Material $Fe_2O_3$, ZnO, NiO, and CuO were blended in a ratio of 47.0 mol %, 16.0 mol %, 27.0 mol %, and 10.0 mol %, respectively, and $Bi_2O_3$ was further blended such that the amount of $Bi_2O_3$ was 1.0 part by mass relative to 100 parts by mass of the total of $Fe_2O_3$, ZnO, NiO, and CuO to obtain a mixture. The mixture was wet-mixed, pulverized, and then dried to remove moisture. The resulting dried product was calcined at a temperature of 800° C. for two hours. The resulting calcined product was wet-pulverized until D50 reached 0.2 μm to prepare a magnetic material.

Preparation of Non-Magnetic Material

ZnO and $SiO_2$ were blended in a molar ratio of 2:1, wet-mixed, pulverized, and then dried to remove moisture. The resulting dried product was calcined at a temperature of 1,100° C. for two hours. The resulting calcined product was wet-pulverized until D50 reached 0.2 μm to prepare a non-magnetic material.

Fabrication of Green Sheets

The obtained magnetic material and non-magnetic material were weighed such that the contents of the main components achieved the proportions of three types (Sample numbers 1 to 3) shown in the table below, and predetermined amounts of an organic binder such as polyvinyl butyral, organic solvents such as ethanol and toluene, and a plasticizer were placed in a ball mill and mixed. Next, each of the resulting mixtures was formed into a sheet having a film thickness of about 25 μm by the doctor blade method, and the sheet was punched into a rectangular shape to fabricate green sheets 12. Next, the green sheets were subjected to laser irradiation to form via holes at predetermined positions. The via holes were filled with a conductive paste prepared as described above by applying the conductive paste by screen printing to form connection conductor patterns 21 and connection via patterns 20. Furthermore, the conductive paste was applied to the green sheets by screen printing to form coil patterns 16 and land patterns 19.

Fabrication of Coil Component

Figures 5A, 5B, 5C, 5D, 5E, 5F, 5G, 5H, 5I, 5J, 5K, 5L, 5M, 5N, 5O, 5P, 5Q, 5R:
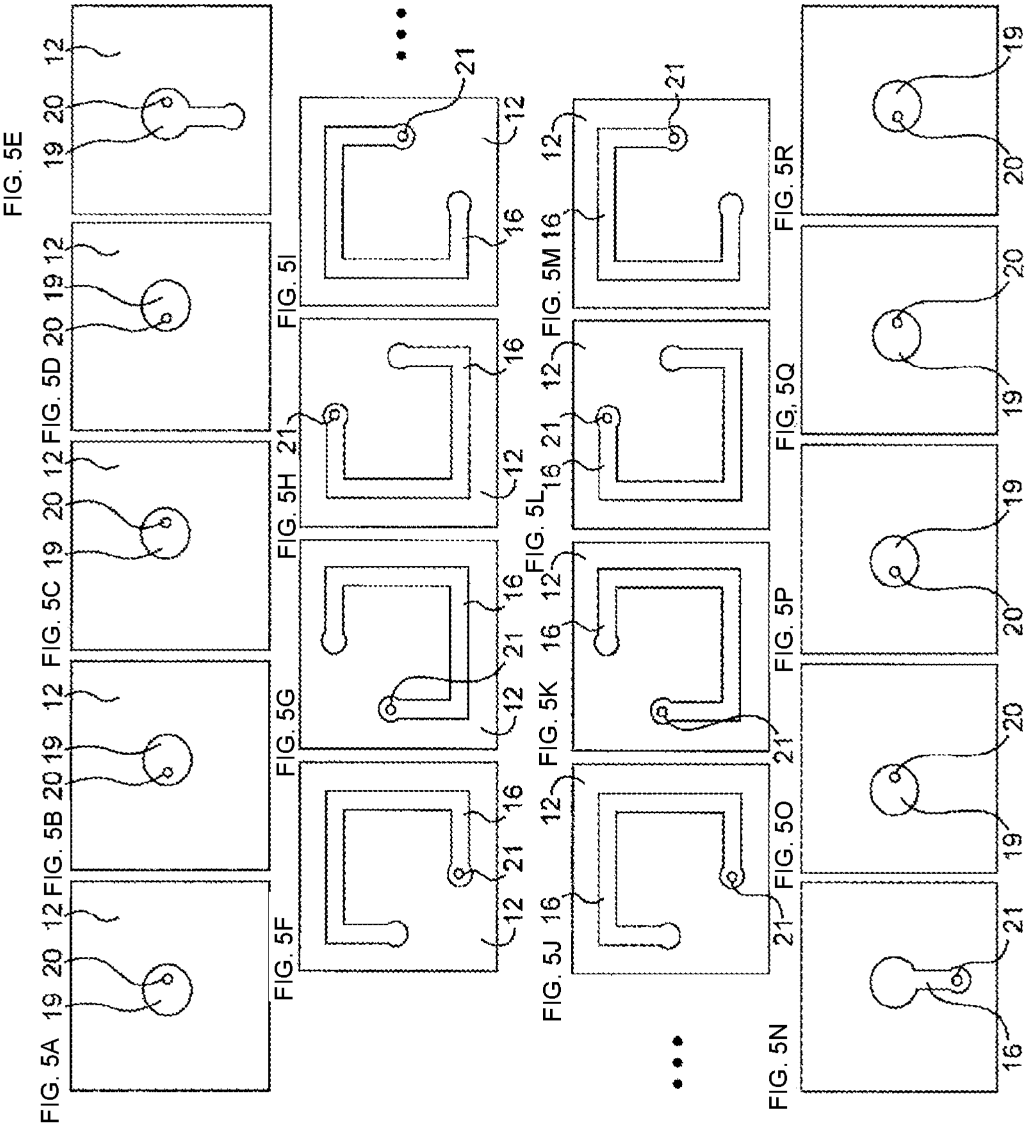
FIGS. 5A to 5R are views illustrating coil patterns of a coil component of Examples.

The green sheets obtained as described above were stacked so as to obtain predetermined coil patterns (refer to FIGS. 5A to 5R), and the resulting stack was thermally pressure-bonded to fabricate a multilayer block. The resulting multilayer block was cut with a dicer to be divided into individual pieces, thus obtaining an unfired element body. Note that via conductors in extended portions were formed such that the centers of adjacent via conductors were displaced by 13 μm from one another after firing (d in FIG. 3A was 13 μm).

The unfired element body obtained as described above was fired at a top temperature of 920° C. for four hours at an oxygen concentration of 0.1 vol % to obtain an element body of a coil component. The resulting element body was placed in a rotary barrel machine along with media and rotated to round edges and corners of the element body.

A conductive paste containing Ag and glass was applied to end surfaces of the element body obtained as described above and baked to form base electrodes. A Ni coating film and a Sn coating film were formed on each of the base electrodes by electrolytic plating, thus forming outer electrodes.

The composition of the insulator part of each of the fabricated coil components (Sample numbers 1 to 3) was analyzed by inductively coupled plasma atomic emission spectroscopy/mass spectrometry (ICP-AES/MS). The results are shown in Table 1 below.

TABLE 1

| Sample | Main component (mol %) | | | | |
|---|---|---|---|---|---|
| number | $Fe_2O_3$ | NiO | ZnO | CuO | $SiO_2$ |
| 1 | 33.8 | 19.4 | 30.3 | 7.2 | 9.3 |
| 2 | 40.1 | 23.1 | 23.4 | 8.5 | 4.9 |
| 3 | 28.0 | 16.2 | 36.4 | 5.9 | 13.5 |

Comparative Example

A coil component (Sample number 4) of Comparative Example was fabricated as in Sample number 1 of Examples except that the pulverization of the calcined products of the magnetic material and the non-magnetic material was not performed, and the firing was performed in an air atmosphere throughout the process.

Evaluation

Each of the fabricated samples of Sample numbers 1 to 4 was stood up vertically, and the sample was embedded in a resin such that the LT surface was exposed. Polishing was performed with a polishing machine in the W direction of the sample and finished at a depth at which a substantially central portion of the multilayer body was exposed. The resulting section was subjected to focused ion-beam processing (FIB processing) to prepare a section for SEM observation. The FIB processing was performed by using an FIB processing apparatus SMI3050R manufactured by SII NanoTechnology Inc.

For the section prepared by FIB processing, a portion (A in FIG. 2) between coil conductors and a substantially central portion (B in FIG. 2) of the multilayer body were photographed with a SEM, and the pore area percentage and the average crystal grain size in each of the portions were measured. The observation area was 8×8 μm. The results are shown in Table 2 below.

TABLE 2

| | | Pore area percentage (%) | | Average crystal grain size (μm) | |
|---|---|---|---|---|---|
| | Sample number | Between coil conductors | Center of multilayer body | Between coil conductors | Center of multilayer body |
| Example 1 | 1 | 1.9 | 3.9 | 0.36 | 0.36 |
| Example 2 | 2 | 2.9 | 4.2 | 0.78 | 0.79 |
| Example 3 | 3 | 0.4 | 1.0 | 0.22 | 0.25 |
| Comparative Example 1 | 4 | 4.0 | 7.0 | 0.91 | 0.95 |

Withstand Voltage Test

To 50 specimens of each of the fabricated samples, a pulse voltage of 200 V was applied 300 times to perform a withstand voltage test. In Sample numbers 1 to 3, no short circuit occurred in the withstand voltage test, whereas in Sample number 4, a short circuit occurred.

The results demonstrated that when a portion of the insulator part located between the coil conductor layers adjacent to each other had a pore area percentage and an average crystal grain size of crystal grains within the ranges of the present disclosure, the coil component had a high withstand voltage.

The coil component according to the present disclosure can be used in a wide variety of applications.

What is claimed is:

1. A coil component comprising:

an insulator;

a coil that is embedded in the insulator and includes a plurality of coil conductor layers electrically connected together; and outer electrodes that are disposed on surfaces of the insulator and are electrically connected to the coil, wherein the insulator includes a magnetic phase containing at least Fe, Ni, Zn, and Cu and a non-magnetic phase containing at least Si and Zn, a portion of the insulator located between, of the coil conductor layers, adjacent coil conductor layers has a pore area percentage of from 0.3% to 3.0%, the portion of the insulator located between the adjacent coil conductor layers includes crystal grains having an average crystal grain size of from 0.2 μm to 0.8 μm, and a substantially central portion of the insulator located on an inner portion between inner edges of the adjacent coil conductor layers has a pore area percentage higher than the pore area percentage of the portion of the insulator located between the adjacent coil conductor layers.

2. The coil component according to claim 1, wherein the substantially central portion of the insulator has a pore area percentage of from 2.0% to 6.0%.

3. The coil component according to claim 2, wherein the insulator contains from 28 mol % to 41 mol % of Fe in terms of $Fe_2O_3$, from 16 mol % to 24 mol % of Ni in terms of NiO, from 23 mol % to 37 mol % of Zn in terms of ZnO, from 5 mol % to 9 mol % of Cu in terms of CuO, and from 4 mol % to 14 mol % of Si in terms of $SiO_2$.

4. The coil component according to claim 3, wherein a stacking direction of the coil conductor layers is parallel to a coil-mounting surface.

5. The coil component according to claim 2, wherein a stacking direction of the coil conductor layers is parallel to a coil-mounting surface.

6. The coil component according to claim 1, wherein the insulator contains from 28 mol % to 41 mol % of Fe in terms of $Fe_2O_3$, from 16 mol % to 24 mol % of Ni in terms of NiO, from 23 mol % to 37 mol % of Zn in terms of ZnO, from 5 mol % to 9 mol % of Cu in terms of CuO, and from 4 mol % to 14 mol % of Si in terms of $SiO_2$.

7. The coil component according to claim 6, wherein a stacking direction of the coil conductor layers is parallel to a coil-mounting surface.

8. The coil component according to claim 1, wherein a stacking direction of the coil conductor layers is parallel to a coil-mounting surface.

9. The coil component according to claim 1, wherein a stacking direction of the coil conductor layers is parallel to a coil-mounting surface.

* * * * *